United States Patent
Hagnere et al.

[19]

[11] Patent Number: 6,012,562
[45] Date of Patent: Jan. 11, 2000

[54] CLUTCH MECHANISM WITH RESILIENT TONGUES, ESPECIALLY FOR MOTOR VEHICLES

[75] Inventors: Raymond Hagnere, Amiens; René Ruguet, Bruay la Buissiere, both of France

[73] Assignee: Valeo, Paris, France

[21] Appl. No.: 08/996,472

[22] Filed: Dec. 22, 1997

[30] Foreign Application Priority Data

Dec. 23, 1996 [FR] France ................................ 96 16029

[51] Int. Cl.[7] .......................... F16D 13/50; F16D 13/70; F16D 13/72
[52] U.S. Cl. ..................... 192/70.18; 192/89.23; 192/113.26
[58] Field of Search ................ 192/70.18, 70.19, 192/89.23, 113.26

[56] References Cited

U.S. PATENT DOCUMENTS

| | | | |
|---|---|---|---|
| 3,283,864 | 11/1966 | Motsch et al. . | |
| 3,305,060 | 2/1967 | Zeidler | 192/70.19 |
| 3,499,512 | 3/1970 | Maurice | 192/89.23 |
| 4,241,820 | 12/1980 | Ban et al. | 192/89.23 |
| 4,531,622 | 7/1985 | Bacher et al. | 192/70.18 |
| 5,127,504 | 7/1992 | Beccaris | 192/70.19 X |
| 5,127,505 | 7/1992 | Beccaris | 192/70.19 |
| 5,358,085 | 10/1994 | Flotow et al. . | |
| 5,622,245 | 4/1997 | Reik et al. | 192/70.18 X |

FOREIGN PATENT DOCUMENTS

| | | |
|---|---|---|
| 1502107 | 2/1968 | France . |
| 1544782 | 1/1969 | France . |
| 1580169 | 9/1969 | France . |
| 2351314 | 12/1977 | France . |
| 2370892 | 6/1978 | France . |
| 2176549 | 12/1986 | United Kingdom . |

*Primary Examiner*—Rodney H. Bonck
*Attorney, Agent, or Firm*—Liniak, Berenato, Longacre & White

[57] ABSTRACT

The clutch mechanism comprises tangential tongues (16) which are fitted axially between the heads (21) of the posts (20) whereby a diaphragm (6) is pivotally mounted on a cover plate (7) and a pressure plate (5), the said tongues being fixed to the base (8) of the cover plate (7) with the aid of spacers (22, 23) which extend through a widened aperture (18) in the diaphragm (6).

8 Claims, 3 Drawing Sheets

CLUTCH MECHANISM WITH RESILIENT TONGUES, ESPECIALLY FOR MOTOR VEHICLES

BACKGROUND OF THE INVENTION

1. Field of the Invention

The present invention relates to friction clutches, especially for motor vehicles, that include one or more friction discs and pressure plates.

The present invention is more particularly concerned with clutch mechanisms which are incorporated in a unit consisting of such a clutch.

2. Description of the Related Art

As is known, a clutch mechanism, such as is described in the document U.S. Pat. No. 3,499,512, comprises a hollow cover plate for fastening the clutch mechanism on a reaction plate, a diaphragm with an outer periphery in the form of a Belleville ring, mounted pivotally on the cover plate by means of posts, a pressure plate acted on by the diaphragm and having a projecting seat for abutment of the outer periphery of the Belleville ring of the diaphragm, and tangentially oriented resilient tongues coupling the pressure plate to the cover plate in rotation but with axial mobility, wherein the posts are fixed to the base of the cover plate and have heads which are profiled so as to constitute a secondary abutment for the inner periphery of the Belleville ring of the diaphragm, in facing relationship with a primary abutment carried by the base of the cover plate.

The above mentioned posts enable overall axial size of the clutch mechanism to be reduced, and are fixed to the base of the cover plate.

Conventionally, the tangential tongues are secured by riveting to respective radially projecting lugs carried by the pressure plate at its outer periphery, and to a radial flange carried by the cover plate at its outer periphery.

This results in an increase in the radial dimension of the pressure plate, because of its lugs.

An object of the invention is to reduce the radial size of the pressure plate, while enjoying the benefit of an arrangement having posts with profiled heads.

SUMMARY OF THE INVENTION

According to the invention, a clutch of the type defined above, wherein the posts are located radially inwardly of the abutment seat of the pressure plate, and wherein the diaphragm has widened apertures in the vicinity of the inner periphery of its Belleville ring, with the posts extending through these apertures, is characterised in that the resilient tongues are fitted axially between the pressure plate and the heads of the posts and radially inwardly of the abutment seat of the pressure plate, and in that the said tongues are fixed at one of their ends to the base of the cover plate by means of spacers extending through the said widened apertures.

Thanks to the invention, the pressure plate does not have any projecting fastening lugs, and, due to the spacers, the posts are not modified.

The said spacers are longer in the axial direction than the posts.

Preferably, the tongues pass in front of the heads of the posts, and are fixed to the pressure plate with the aid of fastening members, each of which is located in axial facing relationship with a widened aperture of the diaphragm.

Thus the tongues extend between two widened apertures of the diaphragm, on either side of a post with a profiled head.

These particular apertures are disposed asymmetrically with respect to the posts, so that the resilient tongues can be of the required length.

Thus, the diaphragm is fixed to the cover plate by means of the posts, and in a second step the tongues are fixed to the cover plate with the aid of the spacers, while finally, by means of holes formed in the cover plate in axial coincidence with the apertures associated with the fastening members, the pressure plate is secured to the tongues, for example by riveting.

The fastening members are disposed on the friction surface of the pressure plate.

With these arrangements, the pressure plate is simplified, as is the cover plate, because the tongues are fastened on the base of the cover plate.

The clutch can rotate at high rotational speeds, and may have two friction discs so as to make it more compact in the radial dimension.

In this connection, the cover plate has an intact skirt, due to the method of fastening of the tongues in accordance with the invention, so that the said skirt is strong enough for the other pressure plate to be able to be driven by the skirt through a coupling of the tenon and mortice type, with the mortices consisting of blind axial slots formed in the peripheral skirt of the cover plate.

It is possible for the mortices to be formed on the reaction plate, and to build a unitary module which includes the clutch mechanism according to the invention, together with a further pressure plate, the reaction plate and two friction discs.

The cover plate may be fastened by seaming to the reaction plate. The solidity of the cover plate enables the reaction plate to be fixed peripherally at several points to a radial drive plate, or to a pulley, i.e. to a radial plate element of the latter, with the aid for example of fastening screws which are engaged in holes in the reaction plate, while radial compactness is preserved.

In this connection, the skirt may be slotted to enable a fastening tool to pass through it, so as to give access to the heads of the fastening screws for the reaction plate, or to the radial plate or the pulley.

In all cases, for the purpose of fitting the tongues, use is made of the cavity which is defined axially by the diaphragm and its associated pressure plate, the said cavity being defined radially on the outside by the abutment seats of the pressure plate, and being open radially inwardly.

The tangential tongues are thus masked and protected.

The spacers may be made to project by a press-forming operation on the base of the cover plate. They are preferably attached on the cover plate so as to modify the latter as little as possible.

BRIEF DESCRIPTION OF THE DRAWINGS

The following description illustrates the invention with reference to the attached drawings, in which.

DESCRIPTION OF PREFERRED EMBODIMENTS

Figure 1:
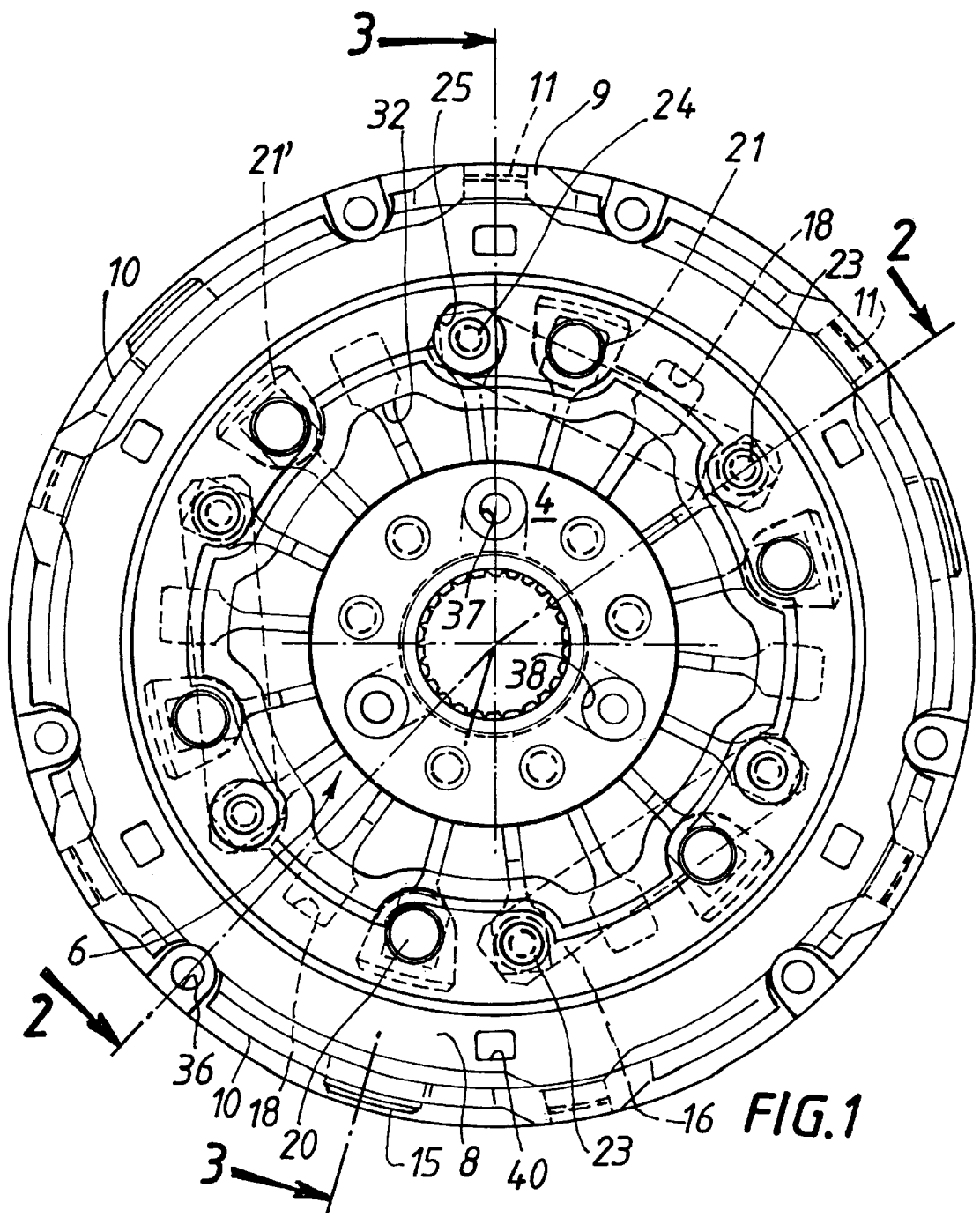
FIG. 1 is a rear view of the clutch according to the invention.

The drawings show a friction clutch comprising an assembly of annular components, namely, in axial succession from front to rear (FIG. 1), a reaction plate 1, a first friction disc 2, an intermediate pressure plate 3, a second friction disc 4, a terminal pressure plate 5, a diaphragm 6 and a cover plate 7 of hollow construction, which in this example serves to house the diaphragm 6, the plates 3, 5 and the discs 2, 4.

The reaction plate 1 and the pressure plate 3, 5 are of moulded material, being castings in this example.

In this example, the friction discs 2, 4 are of the rigid type and are identical. They have at their outer periphery (FIGS. 2 and 3) two friction liners extending on either side of a support disc which is fixed, in this example by riveting, to a radial plate element integral with a hub, which is splined internally for coupling the friction disc in rotation with a first shaft.

In another version, the friction discs may be coupled elastically to the hub.

The diaphragm 6 bears on the cover plate 7 so as to act on the terminal pressure plate 5 and to grip the friction liners of the friction discs 2, 4 between the plates 1, 3, 5.

For this purpose, the intermediate pressure plate 3 has a front friction face and a rear friction face, while the reaction plate 1 and the terminal pressure plate 5 have, respectively, a rear friction face and a front friction face.

In the known way, the clutch is normally engaged, and there is no transmission of torque between the first shaft, which is fixed in rotation to the friction discs 2, 4, and a second shaft which is coupled in rotation to the reaction plate 1 in a manner to be described later herein.

In this example the clutch rotates at high speeds of rotation and is compact in the radial direction, so that it has two friction discs.

The clutch is constructed so as to form a unitary module. For this purpose the cover plate 7 is attached by seaming on the outer periphery of the reaction plate 1.

The cover plate 7, which in this example is of press-formed sheet steel, has a transversely oriented base having a central hole. This base, 8, is extended at its outer periphery by an axially oriented annular skirt which is here divided into annular sectors 9, 10.

Each one of some of the sectors, 9, has at its free end a lug 11 of reduced thickness. The other sectors, 10, are arranged to make engagement through the edge of their free end against the back face 12 of the reaction plate 1, which defines, as mentioned above, a friction surface for the first friction disc 2. For this purpose the skirt 9, 10 does of course surround the friction liners of the friction discs 2, 4. The said skirt also surrounds the terminal pressure plate 5 and the main portion of the intermediate pressure plate 3.

The sectors 9 are offset radially outwardly with respect to the sectors 10. The number of sectors 9, 10 depends on the applications.

The sectors 9 are spaced apart circumferentially at regular intervals, with two consecutive sectors 9 being joined together by a sector 10.

The sectors 10, which will be called second sectors hereinafter, have, firstly axial slots 13 which extend axially through the skirt 9, 10 over its whole length (FIG. 2), and secondly, blind axial slots 14 (FIG. 3) which extend axially in the skirt 9, 10 over part of its length.

The blind slots 14 are open at the free end of the second sectors 10, and constitute mortices. The intermediate pressure plate 3 has, in correspondence with the slots 14, lugs 15 which project radially outwards. The lugs 15 constitute tenons which are engaged in the mortices 14. The intermediate pressure plate 3 is thus coupled in rotation to the cover plate 7, with freedom for axial displacement.

The terminal pressure plate 5 is also coupled in rotation to the cover plate 7, with freedom for axial displacement, by means of resilient tongues 16, which are oriented tangentially and which exert a return force on the terminal pressure plate 5 towards the base 8 of the cover plate 7.

It will be noted that the lugs 15 extend radially, firstly beyond the slots 14 and secondly within the outer periphery of the reaction plate 1 and sectors 9, the latter being referred to hereinafter as first sectors.

In accordance with one feature, the tongues 16 extend radially within the cover plate 7, that is to say radially inwardly of the outer periphery of the terminal pressure plate 5.

This outer periphery is so configured as to offer an axially projecting abutment seat 17 to the diaphragm 6.

For this purpose, the seat 17 is rounded at its free end so as to make local contact with the diaphragm 6, which, in the known way, has a peripheral portion in the form of a Belleville ring 60 which is extended radially towards the centre by a central portion divided into radial fingers 61 by slots, as can be seen in FIG. 1.

The slots are open internally into the central aperture of the diaphragm 6, which is of frusto-conical form in the free state. These slots are blind, and terminate on the outside in widened apertures 18 which are located in the region of the inner periphery of the Belleville ring 60 of the diaphragm 6. These apertures 18 constitute the base of the slots, and in this example they have a generally rectangular cross section.

In the condition where the clutch is engaged, the diaphragm 6 bears on a primary abutment 19 carried by the cover plate 7. In this example the primary abutment 19 is annular in form, and is made by press-forming the base 8 of the cover plate 7 so as to reduce the number of components. The abutment 19 is of pointed form with a rounded edge, so as to make local engagement on the diaphragm 6, and more precisely for engagement on the inner periphery of the Belleville ring of the diaphragm, in the present case the face of the latter which faces towards the base 8. In another version, the primary abutment 19 consists of an annular ring carried by the cover plate 7.

The cover plate 7 carries a post 20, referred to as a delta post. This post 20 is of the same type as that described in the document U.S. Pat. No. 3,499,512, to which reference may be made for more detail. Each post 20 accordingly has a head 21 which is profiled with a bead 21' in the form of an annular sector, so as to constitute a secondary abutment for the diaphragm facing the primary abutment. The secondary abutment 21' is arranged to make contact with the surface of the diaphragm 6 which faces towards the terminal pressure plate 5.

It is the inner periphery of the Belleville ring of the diaphragm 6 that is arranged to make contact with the secondary abutment 21'. In consequence, the post 20 has a hardened head 21, in view of the fact that the annular secondary abutment is divided into beads 21'. The primary abutment 19, which has a greater surface area, does not itself need to be hardened. Each post 20 has a shank which extends axially through one widened orifice 18 so as to terminate in a foot which is riveted on the base 8 of the cover plate 7.

It is through the outer periphery of its Belleville ring that the diaphragm 6 is in contact with the abutment seat 17 of the terminal plate 5, this contact being radially outside the primary abutment 19 and the secondary abutment 21'.

The abutment seat 17 constitutes a boss at the outer periphery of the plate 5, and in this example it is divided into annular sectors. The boss 17 projects axially towards the base 8 of the cover plate 7.

Thus, the diaphragm 6 is mounted for pivoting movement on the cover plate 7 between the primary abutment 19 and the secondary abutment 21' carried by the base 8 of the cover plate 7.

A working clearance exists between these abutments, so as to permit pivoting movement of the diaphragm 6.

In the position in which the clutch is engaged, the diaphragm 6 is, as mentioned above, in contact with the primary abutment 19 so as to grip the friction liners of the friction discs 2, 4 via the plates 1, 3, 5. Torque is transmitted between the first and second shafts. In order to disengage the clutch, a thrust is applied in the usual way, by means of a clutch release bearing (not shown), on the inner ends of the fingers of the diaphragm, so as to cause pivoting of the diaphragm, which is then in contact with the secondary abutment 21'.

After this pivoting movement, the diaphragm 6 no longer exerts any force on the terminal pressure plate 5, so that the friction discs 2, 4 are released, their friction liners therefore being released from the plates 1, 3 and 5.

The tongues 16 then return the terminal plate 5 towards the base 8 of the cover plate 7.

The low axial size present between the base 8 of the cover plate 7 and the heads of the posts 20 will be appreciated. This size is very much reduced in the drawings, because the primary abutment 19 is press-formed in the base 8 of the cover plate 7.

The invention takes advantage of this low axial size, and of the construction of the terminal pressure plate 5 and the widened apertures 18 of the diaphragm 6.

More precisely, the resilient tongues 6 are fixed at one of their ends to the base 8 of the cover plate 7, in this example with the aid of spacers 22, 23 which extend through the widened apertures 18 in the diaphragm 6.

At their other end, the tongues 16 are fixed to the terminal pressure plate 5 by means of fastening members 24, which are here in the form of rivets but which, in another version, may be screws or bolts. These rivets 24 are fitted at the level of a further aperture 18 (FIG. 1).

The base 8 of the cover plate 7 has passage holes 25 which are in axial facing relationship with the rivets 24 and the associated apertures 18. The tongues 16 therefore extend from one end to the other tangentially between two widened apertures 18 which are not consecutive.

The tongues 16 extend, in accordance with the invention, axially between the pressure plate 5 and the heads 21 of the posts, and are disposed radially inwardly of the boss 17 of the pressure plate 5.

According to one feature, the apertures 18 associated with the ends of the tongues 16 are disposed on either side of a widened aperture 18 through which a post 20 passes, this arrangement being asymmetrical in order to increase the length of the said tongues.

The number of tongues 16 and posts 20 does of course depend on the application.

Thus, the tongues 16 extend, in accordance with the invention, axially in front of the heads of the posts 20, that is to say between the heads 21 of the posts 20 and the transversely oriented main portion of the terminal pressure plate 5.

The tongues 16 lie radially inwardly of the divided boss 17 of the said plate 5, in a cavity which is open radially inwardly and which is delimited by the terminal pressure plate 5 and the diaphragm 6, the bosses 17 partially closing the cavity radially towards the outside.

In this example, the spacers 22, 23 are longer in the axial direction than the posts 20, being carried by the base 8 of the cover plate 7 alternately with the posts 20.

Thus, the tongues 60 may extend in front of the heads 21 of the posts without interfering with the latter.

In this example, the spacers are in two coaxial parts of different hardnesses, namely an outer part 22 which is engaged in a widened aperture 18 and an inner part 23, which is a fastening part. This outer part is of tubular form, extends through one aperture 18 and is hardened because, like the post 20, it is to make contact with one of the flanks of an aperture 18 in the diaphragm, which is a tempered component and therefore has a high degree of hardness.

The inner part 23 is engaged within the outer part 22 and extends through the latter. The inner part serves to fasten the spacer 22, 23 to the base 8 of the cover plate 7, and serves for fastening the tongue 16. The inner part 23, which is in the form of an elongated rivet, is less hard than the outer part 22.

The head of the inner part 23 serves for the axial immobilisation of the tongue 16, which is thus gripped axially between the head of the inner part 23 and the outer part 22 (i.e. the free end of the latter). The head of the inner part 23 is riveted on the base 8 with the shank of the inner part extending through an axially coincident hole in the tongue 16, the internal bore of the outer part 22 and a hole in the base 8 of the cover plate 7.

As will have been understood, the cover plate 7, which in the present case is light because it is a steel pressing, and which has a small radial size, constitutes, with the diaphragm 6 and the terminal pressure plate 5, a unitary assembly or so-called clutch mechanism. The said plate 5 and the said diaphragm 6 are completely surrounded by the skirt 9, 10 of the cover plate 7. The terminal pressure plate 5 can rotate at high speed because it has no fastening lugs at its outer periphery, as can be seen in FIG. 1 of the document U.S. Pat. No. 3,499,512.

Fitting of the clutch mechanism is carried out by first fixing the diaphragm 6 pivotally on the base 8 of the cover plate 7 by means of the posts 20.

The ends of the tongues 16 are then fixed to the said base 8 with the aid of the spacers 22, 23. Finally, the terminal pressure plate is fixed on the other end of the tongues 16 with the aid of the rivets 24 and holes 25, which are formed in the base 8 in axial facing relationship with the rivets 24 and in axial coincidence with the widened apertures 18.

After this, and finally, the friction disc 4 is fitted in contact with the plate 5, after which the lugs 15 of the intermediate plate 3 are inserted into the blind slots 14, following which the friction disc 2 is fitted in contact with the pressure plate 3, while finally, the reaction plate 1 is positioned in contact with the terminal portion of the sectors 10, and the lugs 11 are seamed by upsetting them so as to complete the module.

To this end, the lugs 11 are upset radially inwardly into recesses 30 in the front face 31 of the reaction plate 1. The plate 1 is thus gripped at its outer periphery between the shoulder which is present at the root zone of the lugs 11 with the first sectors 9, and the upset free end of the lugs 11.

It will be noted that the reaction plate 1 closes off the blind slots 14.

In this example, the lugs 11 extend, in a complementary manner, through slots 28 which are formed in the outer periphery of the reaction plate 1, so that the cover plate 7 is coupled in rotation to the reaction plate 1 by mating cooperation. In another version, the lugs 11 may of course be not bent back radially, the lugs 11 then being for example welded on the front face of the reaction plate after having been passed through the slots.

Thanks to this type of fastening, the radial size is reduced because no radial fastening flange is provided.

In this example, the clutch is of small radial dimension, which is why it has two friction discs 2, 4 for transmitting the desired torque. The friction discs 2, 4 come very close to the inner periphery of the skirt 9, 10 and the outer periphery of the reaction plate 1.

In another version, the clutch may have only one friction disc, being then of larger radial dimension.

In that case, the sectors of the bosses 17 are not necessarily located at the outer periphery of the pressure plate 5.

Figure 2:
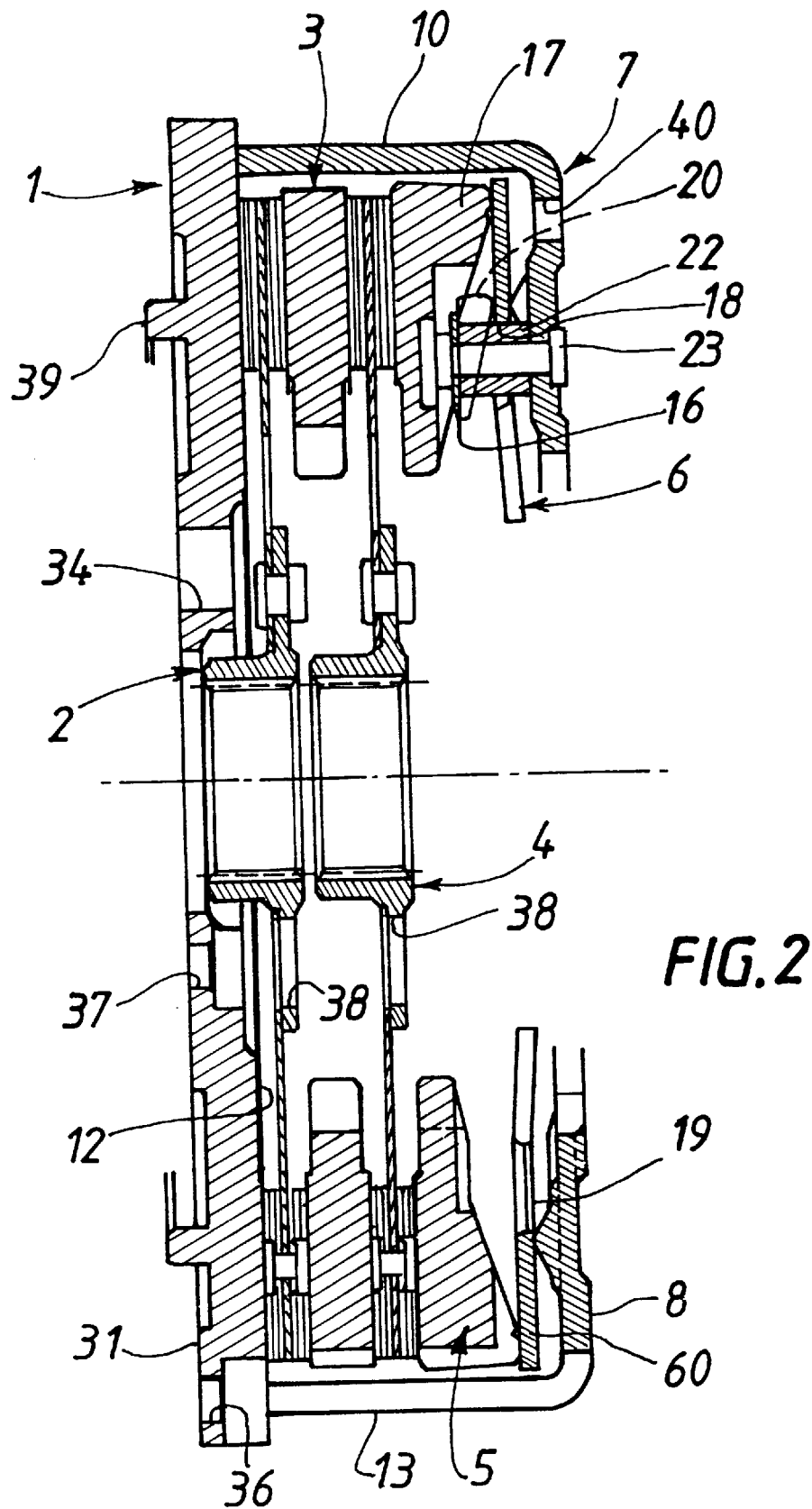
FIGS. 2 and 3 are views on an enlarged scale, in cross section taken on the lines 2—2 and 3—3 in FIG. 1.
Figure 3:
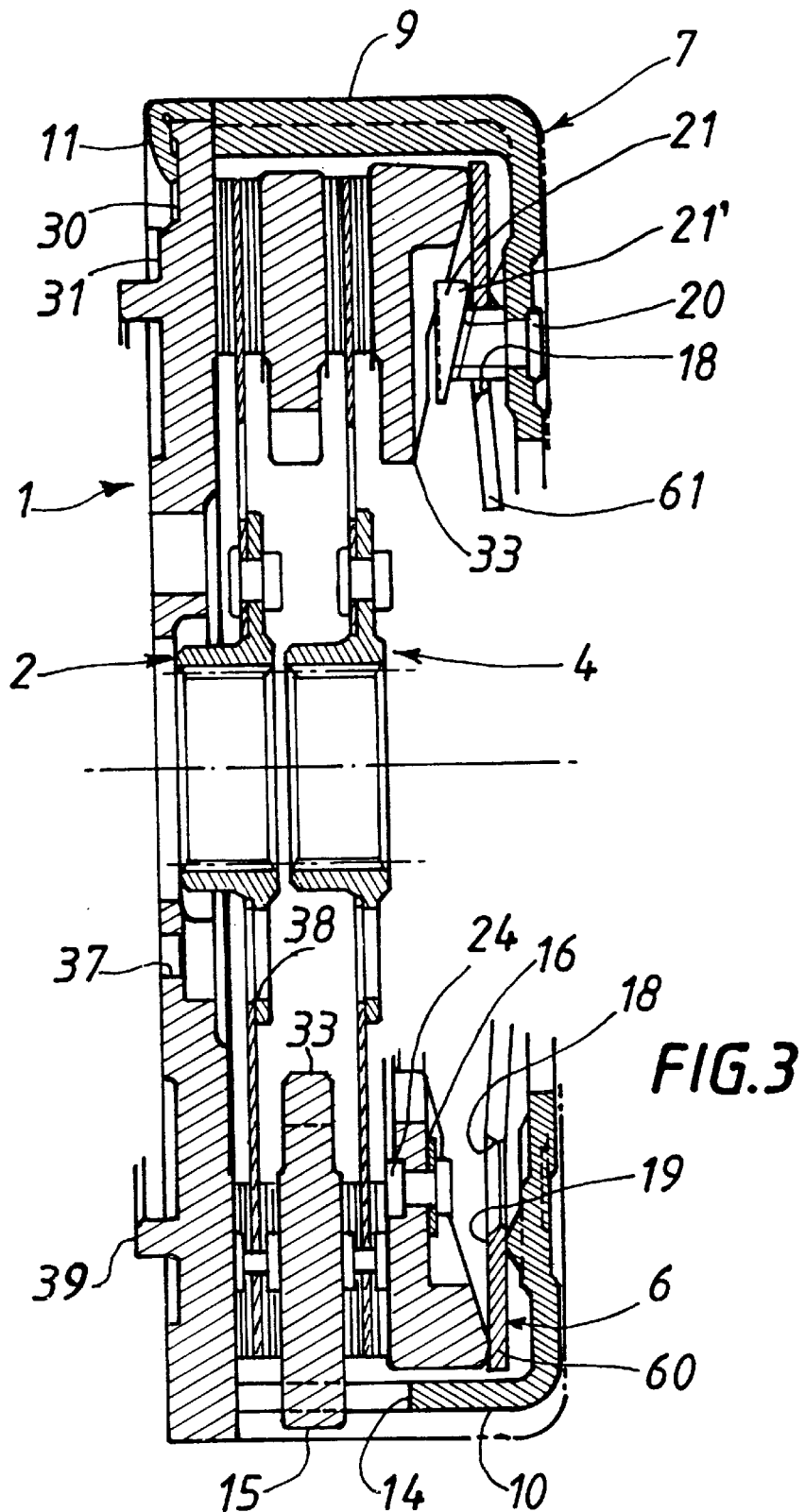

Nevertheless, the clutch mechanism does include tangential tongues 16 fitted between the heads of the posts and the pressure plate as in FIGS. 1 to 3. In every case, the rivets 24 are engaged with the friction face of the pressure plate 5.

In another version, the cover plate 7 may be fixed to the reaction plate 1 by means of screws, with the free end of the annular skirt having a radial flange which extends outwardly as in FIG. 1 of the document U.S. Pat. No. 3,499,512.

It is not essential to construct a clutch module.

In FIGS. 1 to 3, the base 8 of the cover plate has holes 40 (FIGS. 1 and 2) which constitute an ignition target for an ignition sensor, not shown. These holes are located radially outwardly of the posts 20.

The central hole in the base 8 of the cover plate 7 is not a continuous circle. This hole is formed with notches, each of which has a base portion 32 which is located radially inwardly of one sector of the boss 17. At the level of the base portion 37 of the notch, the cover plate has a reduced thickness. The notches with their base portions 32, and the reduction in thickness of the cover plate 7 in line with the base portions 37 of the notches, enable the diaphragm 6 to be ventilated. The holes 40 also encourage ventilation.

Each plate 3, 5 has at its inner periphery ventilating fins 33 which extend radially inwardly, in the manner described in the document FR-95 13839 of Nov. 22, 1995.

The reaction plate 1 has internal ventilating holes 34. In the condition in which the clutch is disengaged, the friction liners of the friction discs 2, 4 are well ventilated due to the fins 33.

In general terms, because of the holes 34, the fins 33, the base portion 32, and the local reduction in thickness of the cover plate 7, excellent ventilation of the clutch is obtained in combination with the slots 13, 14 of the cover plate 7, closed by the reaction plate 1.

The reaction plate 1 includes, at its outer periphery, stepped holes 36 which constitute extensions of the slots 13. At its inner periphery it has stepped holes 37 aligned with facing holes 38 of larger dimension, which are formed in axial coincidence in the hubs of the friction discs 2 and 4.

The reaction plate also includes spigot elements 39 which project axially with respect to the front face of the reaction plate 1. These spigot elements 39 constitute centering elements for mounting in centering holes formed in a pulley associated with the second shaft.

In another version, there may be a radial support plate fixed to the second shaft. The holes 36 and 37 are adapted for the fastening of the module on the said pulley with the aid of fastening screws. This is why the skirt 9, 10 has slots 13 through which a tool can be passed for tightening the fastening screws and for access to the heads of the said screws, the heads being in this example formed with profiled sockets.

In this example, there are three holes 37, six holes 36 and three spigot elements 9 (FIG. 1).

Three sets of tongues 16, spaced apart at 120°, are provided. Each set may comprise one or more tongues 16 superimposed on each other. Six posts 20 and six sectors 9 with lugs 11 are provided, together with six notches 32 and six holes 40, as can be seen best in FIG. 1.

All of this does of course depend on the application. In this example the first shaft is a driven shaft and the pulley is part of a variable pulley-type speed varying device, the second shaft being a driving shaft.

In another version the reaction plate 1 may be fixed on the crankshaft of the engine of the vehicle, which then constitutes the second shaft, in this case having a driving function while the first shaft is the driven input shaft of the gearbox.

In general terms, the first shaft may be a driving shaft or a driven shaft, and the second shaft may be a driven shaft or a driving shaft.

It will be appreciated that the distribution of the widened apertures 18 enables good ventilation and good fastening of the tongues 16 and the posts 20 with their heads 21 to be obtained.

The apertures 18 are, respectively, in axial facing relationship with the rivets 24, posts 20, spacers 22, 23 and the base portions 32 of the notches.

Thus, a first set of apertures 18 of the diaphragm 6 is associated with the base 32 and a second set of apertures 18 is associated with the posts, while a third set and a fourth set of apertures 18 are associated with the ends of the tongues 16 and with, respectively, the spacers 22, 23 and the rivets 24.

Between two consecutive apertures 18 of the first set of apertures 18 there are two consecutive apertures 18 of the second and third sets of apertures 18, or two consecutive apertures 18 of the second and fourth sets of apertures 18 (FIG. 1).

It will be appreciated that the resilient tongues 16 are protected, and that the cover plate 7 is more robust in the region of the terminal pressure plate 5, because, by contrast with that in the document U.S. Pat. No. 3,499,512, its skirt is not notched to enable projecting lugs of the pressure plate 5 to pass through. The absence of such lugs facilitates dynamic balancing of the pressure plate 5 and facilitates its manufacture.

The back face of the pressure plate 5 is of course recessed in facing relationship with the heads of the spacers 22, 23.

The base 8 of the cover plate 7 is thicker in the region of the apertures of the second, third and fourth sets of apertures 18. In the region of the first set of apertures 18, the base 8 is thinner, the base portions 32 of the notches being located at the base of an aperture 18.

The base 8 thus has thicker zones and thinner zones disposed alternately with each other circumferentially, given that the base portions 32 of the notches are located radially inwardly of an annular sector of the abutment seat 17.

In general terms, the fastening zone for the spacers 22, 23 and posts 20 is slightly offset axially towards the pressure plate 5 with respect to the main portion of the base 8, in such a way that the feet of the posts 20 and spacers 22, 23 do not project axially with respect to the cover plate.

The present invention is of course not limited to the embodiments described. In particular the spacers may project directly from the base 8 of the cover plate 7, being formed accordingly by a stamping operation and being longer in the axial direction than the posts, so as to avoid any interference with the said posts as in FIGS. 1 to 3.

We claim:

1. A clutch mechanism comprising a hollow cover plate (7) with a base (8) having a central hole, for fastening the clutch mechanism on a reaction plate (1), a diaphragm (6) with an outer periphery in a form of a belleville ring (60), mounted pivotally on the cover plate by means of posts (20), a pressure plate (5) acted on by the diaphragm (6) and having an abutment seat (17) for abutment of the outer periphery of the belleville ring (60) of the diaphragm (6), and tangentially oriented resilient tongues (16) coupling the pressure plate (5) to the cover plate (7) in rotation but with axial mobility, wherein the posts (20) are fixed to the base (8) of the cover plate (7) and have heads (21) which are profiled so as to constitute a secondary abutment (21') for an inner periphery of the belleville ring (60) of the diaphragm (6), in facing relationship with a primary abutment (19) carried by the base (8) of the cover plate (7), the posts (20) being located radially inwardly of the abutment seat (17) of the pressure plate (5), and wherein the diaphragm (6) has widened apertures (18) in a vicinity of the inner periphery of the belleville ring (60) of the diaphragm (6), with the posts (20) extending through these apertures, wherein the resilient tongues (16) are fitted axially between the pressure plate 5 and the heads (21) of the posts 20 and radially inwardly of the abutment seat (17) of the pressure plate (5), and the tongues (16) are fixed to the base (8) of the cover plate (7) by means of spacers (22, 23) extending through widened apertures (18) of the diaphragm (6), and the spacers (22. 23) are longer in an axial direction than the posts (20).

2. A mechanism according to claim 1, wherein the resilient tongues (16) extend, from one of their ends to the other, tangentially between two non-consecutive widened apertures (18).

3. A mechanism according to claim 1, wherein the widened apertures (18) associated with the ends of the resilient tongues (16) are disposed on either side of a widened aperture (18) through which a post (20) extends.

4. A mechanism according to claim 3, wherein the widened apertures (18) associated with the ends of the resilient tongues (16) are disposed asymmetrically on either side of a widened aperture through which a post (20) extends.

5. A mechanism according to claim 1, wherein the spacers (22, 23) are in two coaxial parts, namely a tubular outer part (22) extending through a widened aperture (18) in the diaphragm (6), and an inner part (23) serving for fastening of the spacer (22, 23) to the base of the cover plate (7) and for fastening of the resilient tongue (16).

6. A mechanism according to claim 1, wherein the central hole in the base (8) of the cover plate (7) is irregular, and has notches with a base (32) located at the base of a widened aperture (18) of the diaphragm (6).

7. A mechanism according to claim 1, wherein the cover plate (7) has at its outer periphery an axially oriented annular skirt (9, 10) formed with blind axial slots (14) for constituting mortices and for driving a second pressure plate (3) in rotation.

8. A clutch mechanism comprising:

a hollow cover plate (7) with a base (8) having a central hole, for fastening the clutch mechanism on a reaction plate (1), a diaphragm (6) with an outer periphery in a form of a belleville ring (60), mounted pivotally on the cover plate by means of posts (20), a pressure plate (5) acted on by the diaphragm (6) and having an abutment seat (17) for abutment of the outer periphery of the belleville ring (60) of the diaphragm (6), and tangentially oriented resilient tongues (16) coupling the pressure plate (5) to the cover plate (7) in rotation but with axial mobility, wherein the posts (20) are fixed to the base (8) of the cover plate (7) and have heads (21) which are profiled so as to constitute a secondary abutment (21') for an inner periphery of the belleville ring (60) of the diaphragm (6), in facing relationship with a primary abutment (19) carried by the base (8) of the cover plate (7), the posts (20) being located radially inwardly of the abutment seat (17) of the pressure plate (5), and wherein the diaphragm (6) has widened apertures (18) in a vicinity of the inner periphery of the belleville ring (60) of the diaphragm (6), with the posts (20) extending through these apertures, wherein the resilient tongues (16) are fitted axially between the pressure plate 5 and the heads (21) of the posts 20 and radially inwardly of the abutment seat (17) of the pressure plate (5), and the tongues (16) are fixed to the base (8) of the cover plate (7) by means of spacers (22, 23) extending through widened apertures (18) of the diaphragm (6), wherein the resilient tongues (16) are fixed to the pressure plate (5) by fastening members (24), each of which is in axial facing relationship with a hole (25) formed in the base (8) of the cover plate (7), in axial coincidence with one of the widened apertures (18) of the diaphragm (6).

* * * * *